United States Patent
Fielding

[19]
[11] Patent Number: 5,386,253
[45] Date of Patent: Jan. 31, 1995

[54] PROJECTION VIDEO DISPLAY SYSTEMS

[75] Inventor: Raymond G. Fielding, Middletown, Great Britain

[73] Assignee: Rank Brimar Limited, Great Britain

[21] Appl. No.: 934,507

[22] PCT Filed: Apr. 9, 1991

[86] PCT. No.: PCT/GB91/00551
§ 371 Date: Nov. 12, 1992
§ 102(e) Date: Nov. 12, 1992

[87] PCT Pub. No.: WO91/15923
PCT Pub. Date: Oct. 17, 1991

[30] Foreign Application Priority Data

Apr. 9, 1990 [GB] United Kingdom ............... 9008031

[51] Int. Cl.6 .................. H04N 9/34; H04N 5/74; H04N 9/64; H04N 9/73
[52] U.S. Cl. .................. 348/745; 348/753; 348/755; 348/758; 348/764
[58] Field of Search .............. 358/60, 62, 64, 65, 358/69, 72, 74, 231, 233, 236, 237; H04N 9/34, 5/74, 9/64, 9/73; 348/744, 750, 751, 755, 758, 761, 764, 766, 770, 771

[56] References Cited

U.S. PATENT DOCUMENTS

| | | | |
|---|---|---|---|
| 4,210,928 | 7/1980 | Ohmori et al. | 358/60 |
| 4,368,963 | 1/1993 | Stolov | 353/31 |
| 4,680,579 | 1/1987 | Ott | 348/755 |
| 4,868,668 | 9/1989 | Tauernetti | 358/237 |
| 5,097,324 | 3/1992 | Tanaka et al. | 358/60 |
| 5,150,205 | 9/1992 | Um et al. | 358/60 |

FOREIGN PATENT DOCUMENTS

| | | | |
|---|---|---|---|
| 0184901 | 6/1986 | European Pat. Off. | H04N 9/64 |
| 0251740 | 1/1988 | European Pat. Off. | H04N 1/036 |
| 0402137 | 12/1990 | European Pat. Off. | H04N 9/31 |
| 114590 | 5/1990 | Japan | H04N 9/31 |
| 245687 | 1/1991 | Japan | H04N 5/74 |
| 2151876 | 7/1985 | United Kingdom | H04N 1/40 |

OTHER PUBLICATIONS

Glenn, William E., "Solid-State-Driven Deformable Television Light Modulator," SID International Symposium, *SID 87 Digest*, May 1987, pp. 72-73.

*Primary Examiner*—Victor R. Kostak
*Assistant Examiner*—Glenton B. Burgess
*Attorney, Agent, or Firm*—Lerner, David, Littenberg, Krumholz & Mentlik

[57] ABSTRACT

A projection system of the kind in which beams of light are projected by a projector onto a screen and the beams are modulated by electronic video information is characterized in that means are provided to vary the intensity of the light falling on different parts of the screen so that to an observer viewing the screen the said light intensity will be perceived as being substantially uniform over substantially the whole are of the screen.

17 Claims, 6 Drawing Sheets

PROJECTION VIDEO DISPLAY SYSTEMS

FIELD OF THE INVENTION

The present invention relates to projection video display systems and more particularly to systems of the kind in which beams of light projected by a projector onto a screen are modulated by a spatial light modulator or light valve device responsive to a video signal.

BACKGROUND OF THE INVENTION

Spatial light modulator display devices include so-called "active matrix" devices, comprising an array of light modulating elements, or "light valves", each of which is controllable by a control signal (usually an electrical signal) to controllably reflect or transmit light in accordance with the control signal. A liquid crystal array is one example of an active matrix device; another example is the deformable mirror device (DMD) array developed by Texas Instruments and described in, for example, U.S. Pat. No. 4,615,595 or in "128×128 deformable mirror device" IEEE Trans. Electron Devices ED-30, 539 (1983), L J Hornbeck. One type of colour video projection display system using a DMD array is described in U.S. Pat. No. 4,680,579.

Generally speaking, a DMD array comprises a plurality of separately addressed electrically deflectable mirrors; if a light beam is directed on the array device, the light reflected in a given direction by the array will depend upon the angle of inclination of each mirror, so that a video image may be superimposed on a reflected beam of light by controlling the mirrors of the array in accordance with the pixel values of a frame of a video signal. To produce a grey scale of intensity, it is possible to control the angle of each mirror through a continuous range using an analog control signal but a greatly preferred alternative method, which gives better contrast, involves controlling the mirror deflection between two positions corresponding to substantially reflective and unreflective states, and controlling the length of time in which the mirror is in the reflective state. Although a pulse width modulation technique could be used, as described in "Deformable Mirror Device Spatial Light Modulators and Their Applicability to Optical Neural Networks", Collins et all, Applied Optics Vol. 28, No. 22, November 1989, page 4904, a preferred technique is disclosed in our United Kingdom Patent Application No. 9100188.3 filed on 4 January 1991 (agents ref. 3203201) incorporated herein by reference.

To produce a colour display, three separately illuminated active matrix devices may be provided, each controlled by a respective colour signal and illuminated by a respective colour light beam, the modulated colour light beams being recombined for display, for example as disclosed in U.S. Pat. No. 4,680,579 or in our UK patent applications 9101715.2 and 9101714.5 filed on 25 January 1991 (agents ref. 3203301 and 3203401), incorporated herein by reference.

One example of a spatial modulator device which is not an active matrix device is the "eidophor" system, in which an oil film is illuminated by a light beam and, simultaneously, scanned by an electron beam controlled by a video signal, which acts to control the reflective state of the oil film.

With projection systems in general, the overall light level in the projected image, as perceived by an observer in the viewing space (for example an auditorium) varies over the screen area. Relatively large scale intensity variations are caused by, for example, the reduction of light intensity towards the edge of the screen due to the physical geometry of the projection system (specifically the projection lens), which is known as "vignetting", and the variation of light intensity due to the variations of angles of incidence over the screen area. U.S. Pat. No. 4,210,928 shows a prior display system, using cathode ray tubes rather than light modulators to correct this type of intensity variation by providing a light blocking plate within the optical path of the projected light beam prior to the screen. However, even with cathode ray tubes this solution is crude, and of limited usefulness since it involves forming and/or mechanically aligning a high precision optical component for each combination of projection system and screen, which is expensive in applications such as audiotorium or cinema projection systems.

In active matrix displays such as DMD displays, where very small mechanical components are electrically deflected, there can be large variations in efficiency of deflection of pixel elements compared to a CRT due to mechanical factors.

Another problem is that the variation of the overall light level or intensity of the image on the screen varies differently when viewed from different positions in the viewing space. This is particularly so when a high gain viewing screen (in other words, one which has a substantially directional reflection characteristic, such as a "PEARLITE" screen) is employed; in general, most of the light is reflected normal to the screen with a sharp decrease in the intensity of reflection when the screen is viewed from one side. A correction which is calculated or derived to improve the viewing from one position within the viewing area may thus actually make matters worse at another point.

Another problem is that intensity variation on a very small scale can occur due to the variations in response of particular picture elements of the active matrix display device within the projector; this problem is particularly marked in presently available DMD devices since the mechanical and electrical responses of individual mirrors are sensitive to manufacturing variations and to environmental factors such as atmospheric moisture. Although the eye generally does not respond to a single isolated pixel intensity variation of this type, numbers of variations across the device give rise to the appearance of spatially static noise known variously as the "grain", "dirty window", "silk stocking" or "mosaic" effects.

EP0184901 proposes to correct a cathode ray rude (not for projection display applications) by initially taking a photograph of the response of the tube to a frame showing the peak amplitude for each colour using a video camera, and then digitising the camera output to provide a stored frame correction signal for each colour. In use, the stored frame correction signal is read out in synchronism with a video signal to be displayed, converted to an analog signal, and subtracted from the video signal. However, since a simultaneous picture of the cathode ray tube is taken, it is necessary that the camera be positioned directly in front of the cathode ray tube.

SUMMARY OF THE INVENTION

In one aspect, the present invention provides a spatial modulator device projection system which has means for compensating the pixel by pixel variations in modulation efficiency of the device. In another aspect, the invention provides a projection system in which correction for variations in spatial reproduction efficiency are derived from a sensor located in the far field (for example, the auditorium or viewing space) of the projection system. In yet another aspect, the invention provides a projection system including a directionally dependent display screen and means for reducing the perceived effects of the directional dependence of the screen. In yet another aspect, the invention provides a method of compensating variations in efficiency of pixel samples of an input video signal to compensate for the efficiency of each display pixel element to which it is directed. Other aspect of the invention are apparent from the claims and description following hereafter.

BRIEF DESCRIPTION OF THE DRAWINGS

How the invention may be carried out will now be described by way of example only, and with reference to the accompanying drawings in which.

DETAILED DESCRIPTION OF THE PREFERRED EMBODIMENTS

Figure 4A:
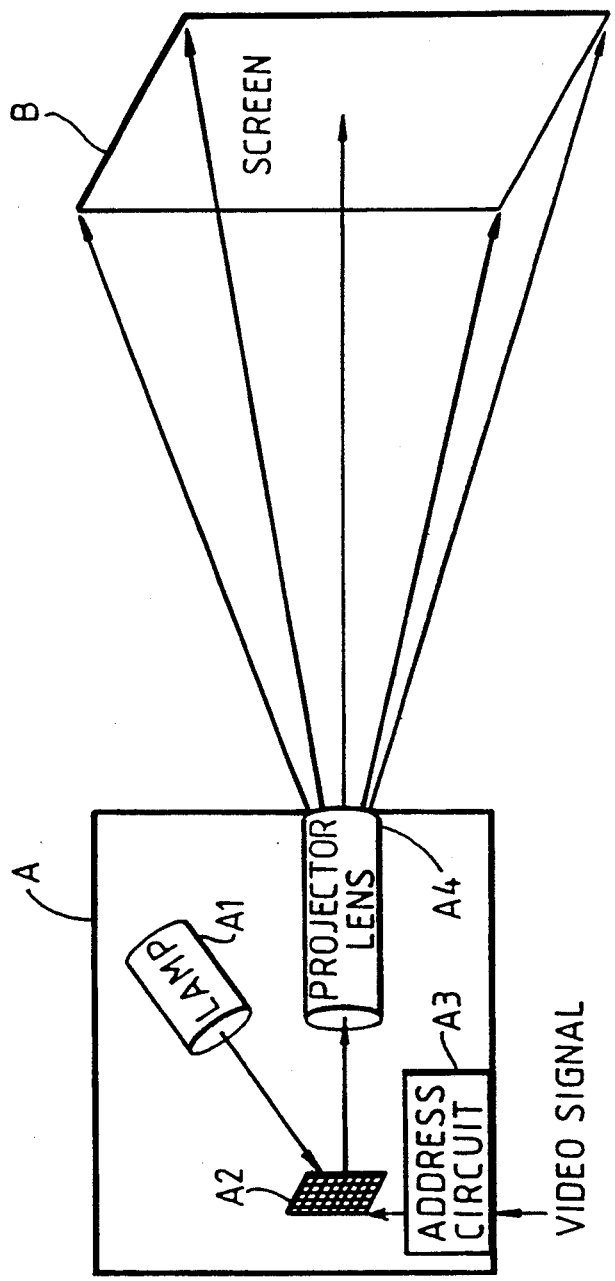
FIGS. 4A to 4C are schematic block diagram showing the general structure of an active matrix projection system.

Referring to FIG. 4A, a projection system comprises a reflective screen (for a example a cinema screen) B and a projector A, positioned and aligned relative to the screen so as to generate a focused image on the screen B.

Figure 4B:
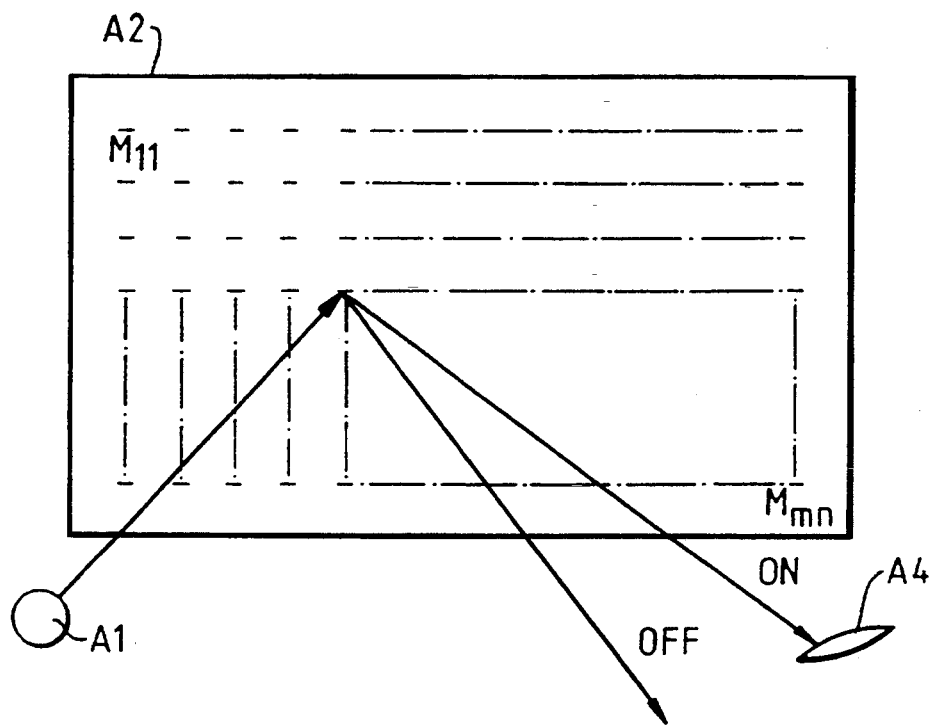
Figure 4C:
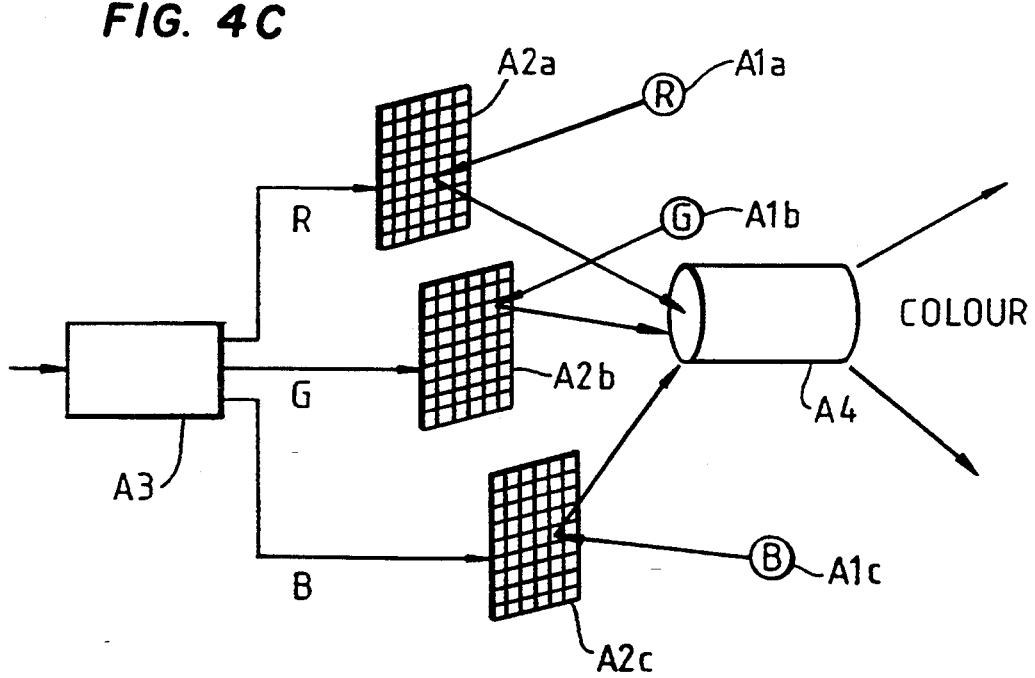

The projector A comprises a lamp A1, typically rated at several kilowatts for a cinema application, generating a light beam which is directed onto a planar active matrix display device A2 comprising, for example, a DMD array of 512×512 individual pixel mirrors. Each mirror of the display device A2 is individually connected to be addressed by an addressing circuit A3 which receives a video signal in any convenient format (for example, a serial raster scanned interlaced field format) and controls each individual mirror in accordance with a corresponding pixel value within the video signal. The reflected and modulated beam from the active matrix device A2 (or rather, from those pixels of the device which have been selectively activated) is directed to a projector lens system A4 which, in a conventional manner, focuses, magnifies and directs the beam onto the screen B as shown schematically in FIG. 4B. In a three colour system, three separate active matrix devices A2a-A2C, one driven by each of three separate colour video signals, with separate illumination arrangements A1a-A1c, may be provided as disclosed in the above mentioned prior art and shown schematically in FIG. 4C; the light reflected from the three devices A2a-A2c is combined (not shown) and supplied to lens A4.

Figure 1:
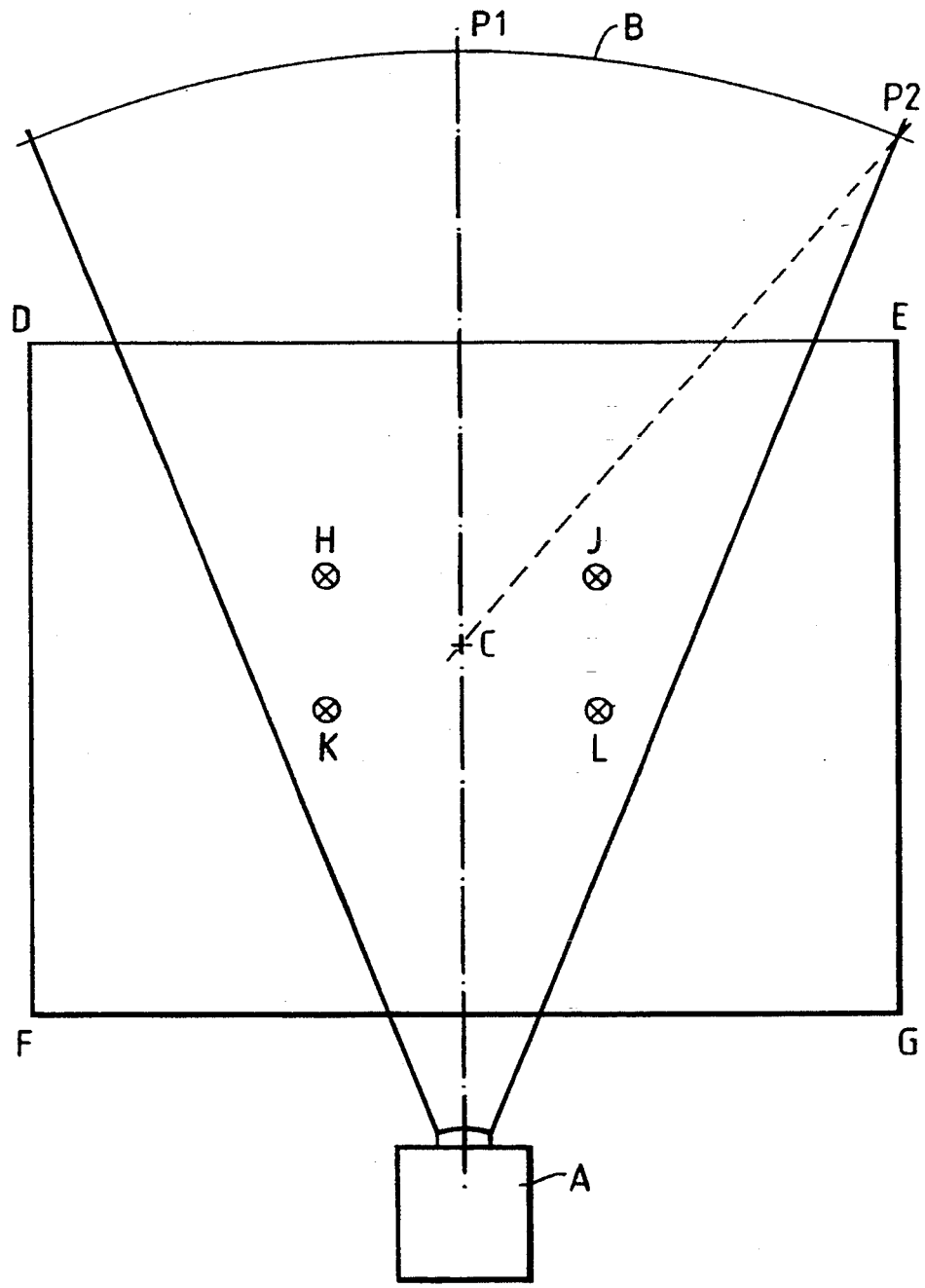
FIG. 1 is a diagrammatic plan view illustrating a projector system of the kind to which the present invention is applied.
Figure 2:
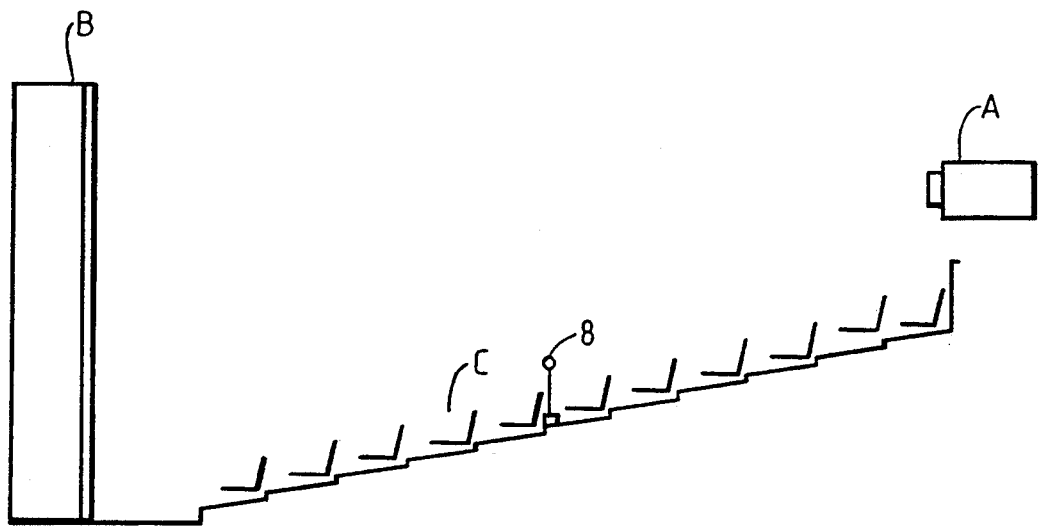
FIG. 2 is a diagrammatic side elevational view of the system shown in FIG. 1.

Referring to FIGS. 1 and 2, in use in an auditorium, the projector A is positioned at a distance from the screen B the latter being of arcuate shape, the projector A being positioned on a line passing through the center of curvature of the arc. A viewing space, or auditorium DEFG, lies between the projector A and the screen B.

A point C is selected within the viewing space DEFG as the position from which the perceived image is to be the optimum.

A photo detector 8 is located at the point C, in order to detect the level of light intensity on the screen B as perceived from the point C.

The general mode of operation of the projection system outlined above will now be described.

Figure 5:
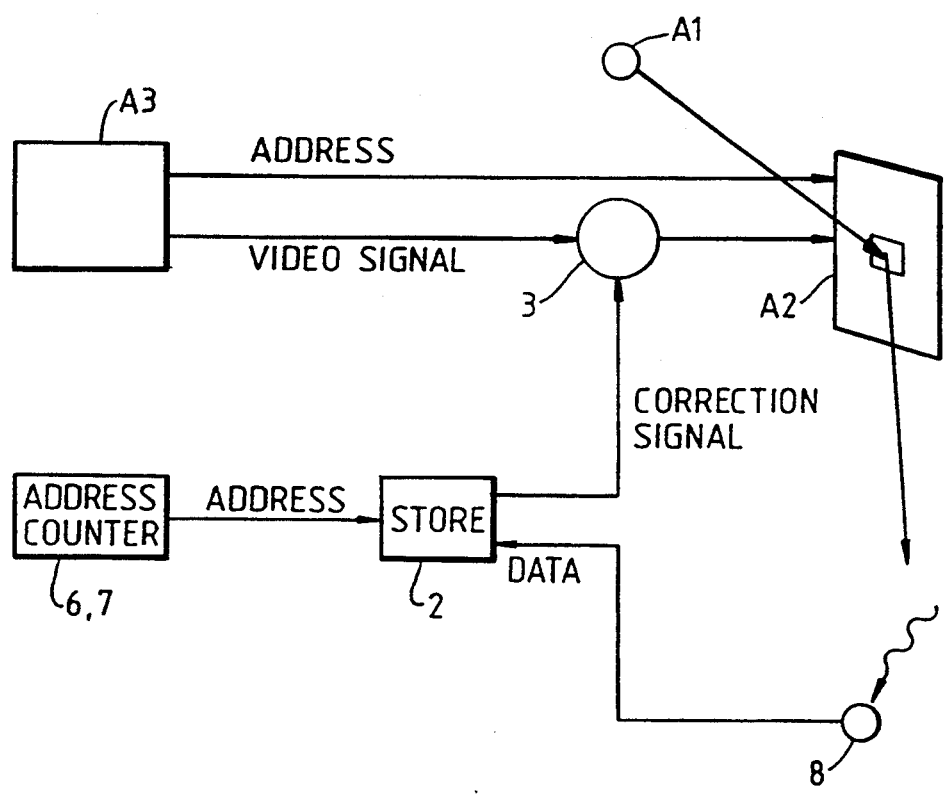
FIG. 5 is a block diagram showing the general structure of part of a display system according to the invention.
Figure 6:
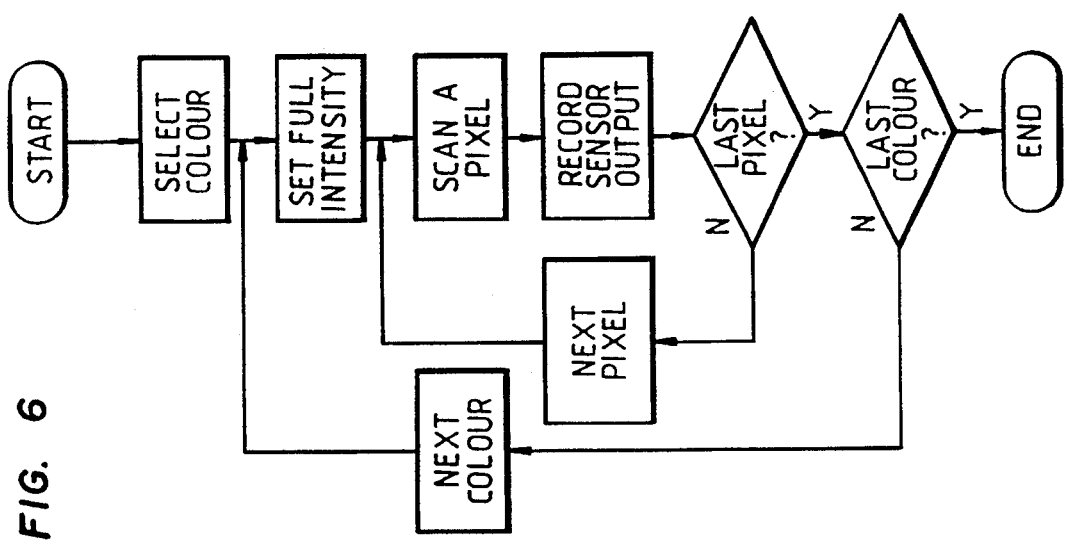
FIG. 6 is a flow diagram showing one method of deriving a correction to be applied in a system according to the invention.

Referring to FIGS. 5 and 6, the system is initially calibrated, by obtaining (via the photo detector 8) correction signals corresponding to each part or pixel of the screen B when the projector A is operating.

A first colour (for example, one of red, green and blue) is selected, the lamp A1 for that colour is activated to illuminate the array device A2 which corresponds to that colour and a test video signal representing full intensity (e.g. peak brightness) for that colour is applied to the address circuit A3 which sequentially activates in turn each pixel of the array A2. The activation sequence is conveniently a raster i.e. row by row scanned sequence.

The photo detector 8 located at point C reads the light intensity reflected from the screen B. A digital signal derived from the output of the photosensor 8 is stored in a location of a store device 2 sufficiently large to include a location for each pixel of the display device A2, and in a colour system one storage device (or area thereof) is provided for each array A2a-A2c. The address of the location is held by a write address generating circuit 6, 7, the output of which is then incremented ready for the next pixel. The addressing circuit A3 then activates the next pixel of the display device A2, and the sensor output is again likewise stored in a corresponding location in the store 2.

When readings have been taken for each pixel of the matrix device A2, the next colour is selected, a test video signal for that colour is generated and applied to the array device corresponding to that colour, and the process is repeated for all the pixels of that array device.

The signals stored in the store 2 may simply comprise the digitised output of the sensor 8, representing the intensity of light detected by the sensor 8. Alternatively, the output of the sensor 8 may be processed (for example, to subtract a value corresponding to any ambient light present) prior to storage.

The store 2 thus stores, pixel by pixel, a map of the perceived light intensity corresponding to each pixel for a video signal corresponding to peak amplitude or brightness. This therefore represents the efficiency or amplitude response of that pixel, on an arbitrary scale.

This map of light intensity or pixel display element efficiency is then used to weight or modify the light projected by the projector A in respect of each pixel display element in such a way that the projected image as a whole, on the screen B, is perceived from the point C as having a substantially uniform intensity. More particularly, it is used to modify the amplitude of the video signal applied to modulate the pixel areas of the display device A2.

Figure 7:
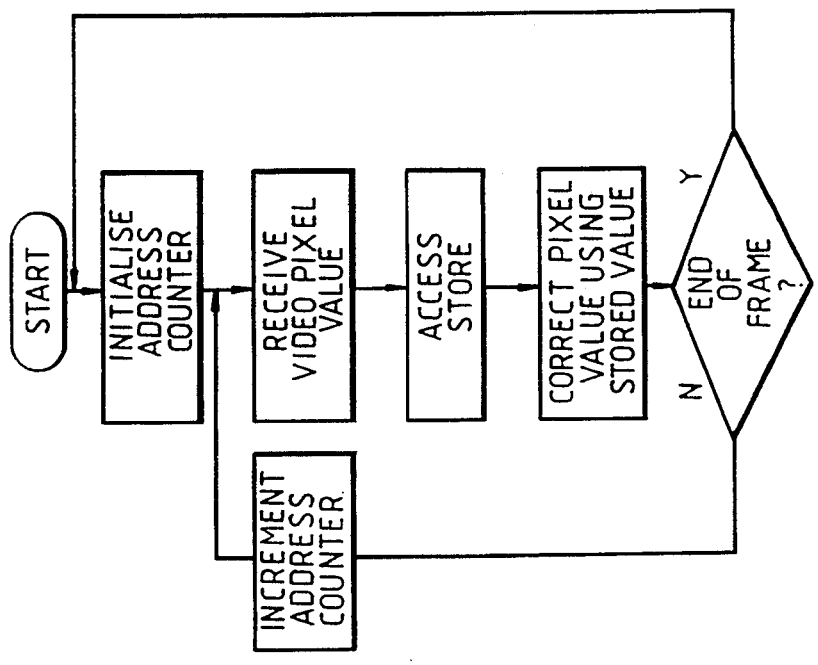
FIG. 7 is a flow diagram showing the process of correction carried out by the apparatus of FIG. 5.

Referring to FIGS. 5 and 7, this is achieved by accessing the store 2 in synchronism with the received video signal, to derive the stored correction value corresponding to the pixel display element with which the video signal at that instant is associated, and to correct the value of the video signal in dependence upon the correction signal. Accordingly, a correction circuit 3 receives the video signal and the correction signal from the store 2 and processes the video signal in dependence on this correction signal to produce a corrected video signal. After each frame of the video signal is complete, the address counter 6, 7, addressing the store 2 is reset to correspond to the first received pixel value of the next frame of the video signal.

Instead of controlling the projector A on the basis of the perception of screen intensity at only one point C, the projector A may be controlled on the basis of photo detectors 8a,8b etc placed at a number of positions, for example points HJKL in FIG. 1, to define an optimum viewing area within the overall viewing space DEFG, in which case the perceived light level is corrected over an area rather than at a point.

The first, or only, sensor position C is preferably located along the center axis of the projected beam from the projector A, since large scale variations of intensity due to geometrical or optical constraints of the projector A and/or the directivity of the screen B are generally symmetrically distributed on either side of the center line. The vertical height of the photo sensor 8 is preferably at around the eye level of an average viewer, as shown in FIG. 2.

The signals from the additional points H, J, K and L may be weighted so that the correction signal stored in the store 2 depends to a lesser extent upon these signals than from the signal from point C or, in general, so that the correction signal depends to a lesser extent upon the signals from sensors distributed progressively further from the center line of the projector beam (since it is expected that intensity variations across the screen are unavoidably larger at these positions).

Other criteria may also be employed in determining the weighting given to the signals from various sensor positions within the auditorium; for example, the signals have positions corresponding to cheaper seats may be given less weight than those corresponding to more expensive seats.

Although separate sensors 8,8a,8b could be provided at each point C, H, J, K, L it may be more convenient to use a single sensor 8, sequentially stationed at each position, and store the readings taken at each position to be subsequently combined to provide a correction signal. Likewise, once the correction signal has been derived, the or each photosensor 8 is preferably removed from the auditorium. Since the performance of individual pixels of an active matrix device 11 may vary over time, it is, however, preferred that the correction signals are re-derived or updated periodically (for example, once per month or once per year).

Figure 3:
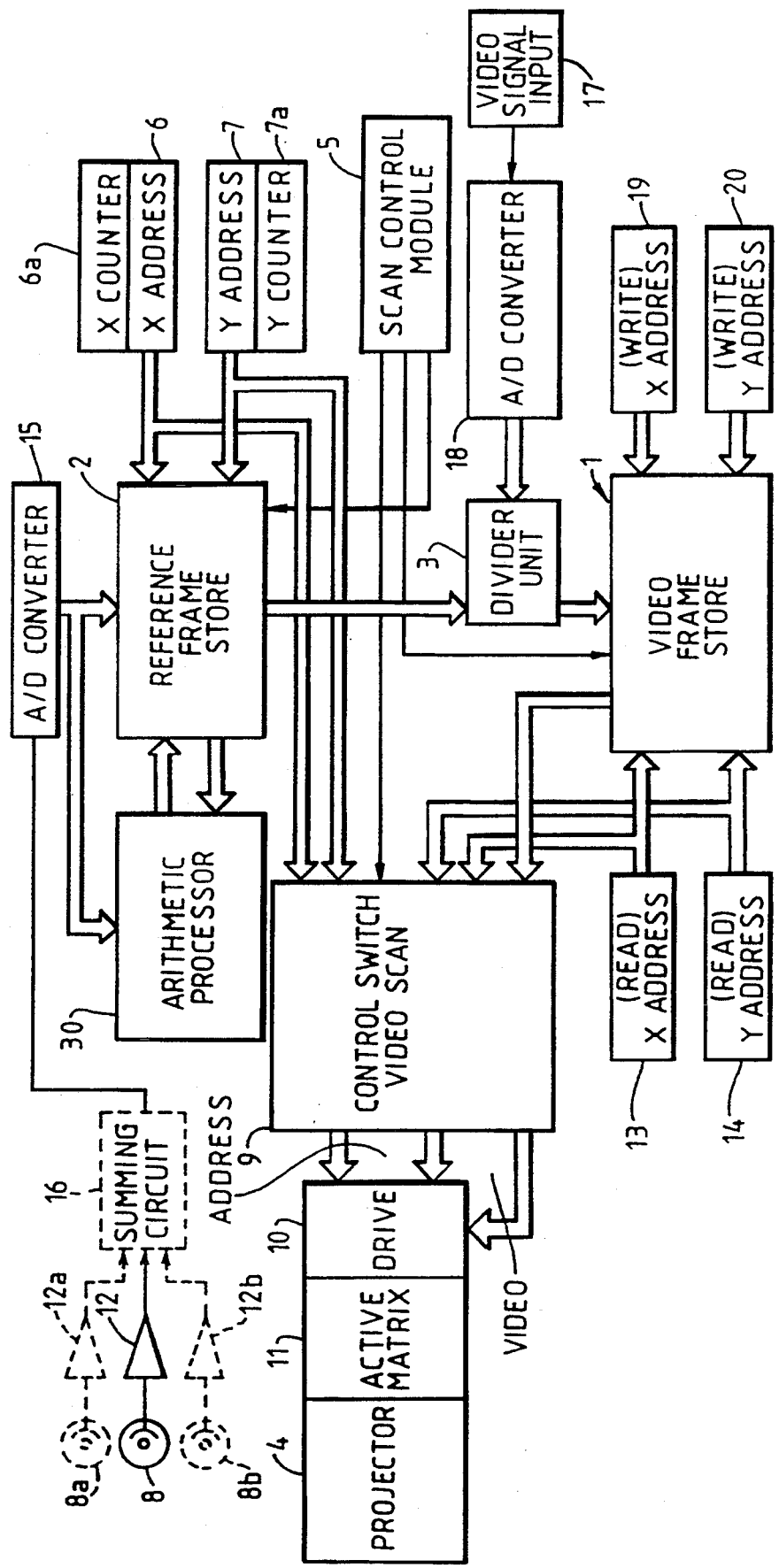
FIG. 3 is a block circuit diagram of one embodiment of the present invention.

A particular arrangement for effecting the general operation described above will now be described with reference to FIG. 3, which for clarity shows only those elements relating to a single light modulator matrix device; in a colour projection system, of course, two further substantially identical arrangements would be provided; one for each colour.

A video signal to be projected by the projector A is received in analogue form at an input 17, sampled and digitised by an analogue to digital converter 18 and stored in a conventional video frame store 1 in which a frame of video data is stored at addresses defined by a column address (x) and a row address (y) corresponding to those of the active matrix 11.

The video frame store 1 has means for supplying an x, y write address (19 and 20 respectively) and means for supplying an x, y read address, (13 and 14 respectively). The write and read address sequences may differ, to enable a frame of data to be written in in a first format and read out in a second, different, format.

Each projector array A2 comprises a DMD light-valve active matrix array 11 which has a drive circuit 10 arranged to address a selected pixel mirror of the DMD array 11 and cause it to deflect in dependence upon a corresponding video signal value.

The drive circuit 10 is controlled by a control switching unit 9 which receives a sequence of video values from the video frame store 1, and corresponding pixel x,y addresses.

There are also provided means for modifying the signals fed from the video frame store 1 via the control switch 9 and driver circuit 10 to the array 11 in order to vary the intensity of the light which would otherwise appear on the screen B, the variation being such as to result in a viewer at the point C or within the prescribed area HJKL perceiving the whole of the image on the screen B as being of substantially the same light intensity (ignoring intentional variations within the video image itself).

These means comprise a reference frame store 2 into which signals from the photo detector 8 are fed through an analogue to digital converter 15.

While more than one photo detector is employed, (e.g. photo detectors 8a and 8b in addition to the photo detector 8) the signals from the three photo detectors are summed by a summing circuit 16. The outputs of the sensors are preferably amplified by respective head amplifiers 12, 12a and 12b at the locations C, H, J, K, L since the connecting wires from the sensors to the projector may traverse a considerable distance in the auditorium leading to signal losses.

The reference frame store 2 is provided with means for addressing locations therein in the form of digital row and column address circuits 6,7 comprising respective counters 6a and 7a the outputs of which are connected to the address lines of the store 2. These are used to enable sequential write and read operations on the reference light intensities or correction signals. In other words the function of the address circuits 6a and 7a is to enable the reference map of the required perceived light intensity levels to be stored in and retrieved from the reference frame store 2, these levels having been derived from the photo sensors 8, 8a, 8b after having been converted to digital form by the digital to analogue converter 15.

The addressing mode (i.e. the sequence of addresses produced by addressing circuits 6,7) of the two frame stores 1 and 2 is controlled by means of a scan control module 5. The way in which this module operates will vary to some extent depending upon the video signal format required by the particular projector being used, and on the format in which the input video signal is received; for example as a pair of interlaced fields and/or as a progressive scan presented in the form of a pixel, line, or field at a time, depending upon the mode of scan.

The digitised video signal from the analogue to digital converter 18 and the correction signal from the reference frame store 2 are fed to a correction unit 3 which produces an output signal to the video frame store 1.

The correction unit 3 modifies the video signal from the analogue to digital converter 18 in accordance with the light intensity map contained in the reference frame store 2 in such a way as to compensate for variations in illumination efficiency.

The correction unit 3 may preferably comprise a digital divider circuit, dividing each digital video sample from the A/D convertor 18 by the corresponding correction value stored in the reference frame store 2 (which will correspond to the maximum intensity which the pixel display element for which that video sample is destined can produce), for example by repeated shifting and subtraction, so that the video sample received by each pixel element of the matrix device 11 is scaled in inverse relation to the maximum response which that pixel element can produce, thus equalising the intensity distribution or response to a video signal across the matrix.

The method of calibrating the system to derive the contents of the reference frame store 2 will now be described in more detail.

The video input to the active matrix 11 of the video projector A is set to a constant value corresponding to peak white by the control switch 9 in response to a signal from the scan control module 5. The same signal is also used to apply the sequential address signals derived from the counters 6a,7a onto the address lines of the active matrix 11 to select a pixel for which the video signal is supplied.

The scan control module 5 also sets the reference frame store 2 to its write mode and initiates the sequential scan in both the video frame store 1 and the reference frame store 2.

As the projector A scans by activating a pixel by pixel sequence the photo sensor 8 or photo sensors 8, 8a, 8b measure the perceived light level and produce signals which are amplified by amplifier 12. In the case of a plurality of photo detectors 8,8a,8b the signals from their associated amplifiers 12,12a,12b may be summed by an analogue summing circuit 16. Alternating resistors (not shown) may be provided to alternate or amplify the signals from the different detectors differently; for example, to alternate those (8a,8b) at peripheral points HJKL by more than that (8) at point C. The signals then pass through the analogue to digital converter 15 and the resulting digital signals are written into the reference frame store 2 at the appropriate addresses.

In a preferred embodiment, to reduce the effects of temporal noise, (i.e. time-varying intensity variations due, for example, to warm air or dust) the results of a number of such calibration scans may be averaged by adding an arithmetic processor 30 to the reference frame store 2.

In this embodiment, rather than merely writing a received digital value from the A/D converter 15 into the location in the reference frame store 2 addressed by the x,y address circuits 6,7, the arithmetic processor 30 reads the existing value in that location, adds the value from the A/D converter 15 and writes the sum back into that location within the reference frame store 2. In this embodiment, the A/D converter 15 may have a resolution of, for example, 6 bits and the locations of the reference frame store may contain a larger number of bits (typically 8 bits). It is thus possible to perform four successive scans of every pixel, and thus produce in each location a stored sum of the four pixel values. These stored sums may then be divided by four to produce an average value, by shifting the contents of each location right twice, or more conveniently the divider unit 3 may be connected to receive only the more significant 6 bits from the data bus output of the reference frame store 2.

Upon completion of the calibration scan or scans the pattern of perceived light values or correction values is held in the reference frame store 2.

The normal operational scanning sequence of the projector A in which the video signal is corrected will now be described.

The scan control module 5 enables the video frame store 1 so that incoming digital video signals may be read into it from its data bus.

The incoming video information is presented in a serial format. Depending upon this format, and on the format in which the matrix 11 is to be scanned, a write address sequence is generated by the address means 19,20 (in conventional fashion) and successive digital values are written into the addresses of the sequence in the video frame store 1. For example, if a row-scanned video signal is received and the matrix is also addressed to perform an identical 512×512 row scan, say, the x address circuit 19 acts as a circulating counter counting from 1-512, clocked at the pixel rate, to generate a scan across a row, and incrementing the y address circuit 20 once each cycle (i.e. at 1/512 the pixel rate) The y address circuit 20 likewise comprises a circulating counter counting between 1-512. The absolute address of a pixel x,y in the frame store may be given by y*512+x.

The x,y address signal generated by the circuits 19,20 is also supplied to the address bus of the reference frame store 2, which accordingly generates at its data output lines a corresponding correction sample. The correction sample and the video signal sample received from the A/D converter 18 are supplied to the divider unit 3 which divides the video sample by the (averaged) peak sample from the reference frame store 2, and the corrected video sample produced by the divider unit 3 is supplied as an input to the data bus of the video frame store 1.

This division is preferably carried out digitally, as shown, but could be by a hybrid or analogue means before the video signal is converted to digital form.

Other ways of correcting the video signal (for example, the subtraction process disclosed in EP0184901) could instead be used, although the division method described is attractively simple and accurate. One particularly obvious alternative would be to divide the digital signals from the A/D convertor 15 into unity prior to storage in the reference frame store 2 and replace the divider 3 by a digital or hybrid multiplier.

The thus corrected video signal is then read into the video frame store 1 from whence it is read out to the matrix 11 (via the drive arrangement 10) in a suitable format comprising an x,y address sequence generated by the read address circuits 13,14. The separate read and write address circuits thus enable a scan conversion operation. As an example, if the x read address generator 13 produces the same sequence as the y write address generator 20, and the y read address generator 14 the same as the x write address generator 19, the read out scan is column by column for a row by row write-in scan.

For this purpose the scan control module 5 sets the scan control unit 9 so that the latter passes addressing information to the projector in an appropriate format from the read addressing system 13, 14 associated with the video frame store 1.

The way in which the correction unit 3 operates will now be briefly described.

Consider two particular pixels P1 and P2 in respect of the area of the screen B, one being located at the center of the screen and the other being located at its edge (see FIG. 1).

Because the pixel P1 is on the center line of the projector A its light intensity on the screen B would, in the absence of the correction system of the present invention, be the maximum light intensity, as perceived by the viewer at C of any point on the screen B.

In contrast the pixel represented by P2 would be the lowest light intensity perceived by the viewer. The purpose of the correction system is to make the light intensities of P1 and P2 as perceived by the viewer at point C substantially the same (for a uniform image), or more generally to equalise the intensities over an area HJKL within the auditorium.

The correction unit 3 could operate to keep the light intensity at P1 the same as it would be in an uncorrected system and bringing up the light intensity at P2 to be substantially the same as that of P1. Alternatively the light intensity at P1 could be reduced to bring it to a level substantially equal to that at P2. A further possibility is for the light intensities at P1 and P2 to be averaged and the average value to be substituted at P1 and P2 in order to make them substantially the same.

Which of these various operations is actually carried out depends upon the way in which the signals from the sensor 8 are digitised by the A/D convertor 15; if the highest recorded signal value is digitised as unity, the effect of division is to increase the amplitude of light at pixels such as P2 whilst leaving that at P1 unchanged. On the other hand, if the lowest recorded signal value is digitised as unity, then the amplitude of all pixels (such as P1) more efficient than the lowest is reduced.

Since it is not in practice generally possible to increase the value of a pixel above the peak white digital value, it is preferred in digital systems to employ the latter process and reduce the amplitude of video signals supplied to more efficient pixels such as P1, so that the greyscale is accurately preserved without clipping. To achieve this, the A/D convertor 15 or the amplifier 12 may be provided with a variable gain control (for example a digitally switched resistance network). To derive a suitable gain control setting, a test scan may be performed and the lowest representative digital pixel value digitised by the A/D convertor 15 is stored. An arithmetic unit (for example a microprocessor) then alters the setting of the gain control, in inverse proportion to the store value, so that when that value is re-digitised in the calibration scan its value will approximately be unity. The calibration scan is then performed as described above.

In order to avoid changing the colour balance, identical gain control settings should be used for all three colours. Since this type of correction tends to reduce the overall brightness of the image, the power of the lamp A1 may be increased correspondingly for example in dependence upon the value of the gain control setting, or upon the difference between minimum and maximum measured pixel efficiencies, for example using thyristor phase control.

The correction system of the present invention thus enables the quality of the image being viewed to be improved in the following way.

Spatial noise occasioned by variations in the efficiency of each individual pixel within the format of an image projected from an electronically controlled projector is reduced.

Variations in the perceived light level caused by the effects of vignetting within the objective lens of the projector are reduced.

Variations in the light level caused by the directional reflection characteristics of a projection screen, as perceived by a viewer at a particular point or within a particular area within the viewing space, are reduced.

Preferably, means for compensating for faulty pixels are also provided in systems according to the present invention; such means are disclosed in our application PCT/GB91/00551 having the same priority date and filing date as the present application, incorporated herein by reference.

I claim:

1. A projection system comprising:
   a light source;
   a two-dimensional spatial light modulator device comprising a plurality of individually controllable modulation elements arranged as an array;
   control means for receiving a video signal representative of an image to be projected;
   means for individually accessing said modulation elements in response to said video signal;
   means for directing a beam of light from said light source onto said modulator device;
   a screen positioned to receive the beam from said light source after modulation by said light modulator device so as to display a projected image; and
   means for varying the video signal so as to change the modulation characteristics of chosen ones of said modulation elements so that the projected image will be perceived by an observer viewing the projected image on the screen as being of substantially uniform intensity over the area of the screen.

2. A system according to claim 1 in which the elements comprise electrically deflectable mirror devices.

3. A system according to claim 2 or 1 further comprising means for receiving a signal from a light sensor and for generating therefrom a reference signal for use in subsequent correction of the video signal to vary the intensity of the light projected onto the screen at different parts thereof.

4. A system according to claim 3 including a light sensor coupled to said receiving means.

5. A system according to claim 3 in which the receiving means is arranged to supply a digital signal for storage in a reference store dimensioned to contain signal value corresponding to the entire area of the screen, further comprising means for receiving the video signal as a plurality of sequential pixel values and for reading corresponding correction values from said store, and for processing the pixel values in accordance with the correction values in such a way as to produce corrected pixel values so as to produce a corrected light intensity from said screen.

6. A system according to claim 5 in which said corrected pixel values are stored in a frame store prior to being employed to control said modulator device.

7. A system according to claim 6 in which there are provided means for generating a sequence of addresses for writing pixel data into said frame store and means for generating a sequence of addresses for reading pixel data out of said frame store, the two sequences being different so as to provide scan conversion.

8. A method of correcting spatially non-uniform amplitude response in a projection system comprising a projector, a spatial light modulator device comprising a plurality of individually controllable modulation elements arranged in an array, each array element being individually addressable by signals representative of portions of the video signal corresponding to a pixel of the displayed image, and a screen, the projector being responsive to said video signal to project a video image onto said screen, comprising the steps of deriving a measure of the amplitude response from different areas of the screen and using the measures thus derived to correct corresponding portions of the video signal which will address array elements corresponding to said different areas of the screen, the measures being derived by measuring received light amplitudes at a plurality of different positions corresponding to different viewing stations in front of said screen.

9. A method according to claim 8 in which greater account is taken of measurements of received light amplitudes from some positions rather than others in correcting said portions of the video signal.

10. A method according to claim 8 or claim 9 in which different areas of the screen are selectively sequentially illuminated and corresponding measurements are sequentially made at each position.

11. A method according to claim 8, in which the video signal values are sequentially corrected in accordance with stored corresponding correction values derived from said measurements.

12. A method of displaying an image using a projection system comprising a projector, a spatial light modulator device comprising a plurality of individually controllable modulation elements arranged in an array, each array element being individually addressable by signals representative of positions of the video signal corresponding to a pixel of the displayed image, and a screen upon which the projector directs a projected image in accordance with an input video image signal, comprising the steps of measuring the spatial variations in intensity response of the projection system and varying the intensity of the projected image falling on different parts of the screen so as to substantially reduce variations in said intensity response, characterized in that said step of measuring comprises performing a plurality of like measurements at different points in time, and combining the results of said measurements so as to reduce the effects thereon of temporal variations in intensity response.

13. A method of displaying a video signal comprising directing a light beam via a spatial light modulator device onto a display screen, said spatial light modulator device comprising an array of individually controllable modulation elements each individually addressable by signals representative of said video signal, and controlling the spatial light modulator device to variably modulate the light beam in dependence upon the video signal, the method being characterized in comprising the step of modifying the video signal in dependence upon a predetermined reference signal to change the modulation characteristics of chosen ones of said modulation elements so as to reduce effects of spatial variations in illumination efficiency in the beam, as displayed on the display screen as perceived by an observer.

14. A method according to claim 13, the method being further characterised in including the step of deriving the reference signal by positioning a light sensor at a viewing position relative to said screen.

15. A method according to claim 13 further characterized in that the modifying comprises scaling each portion of the video signal in inverse relation to the perceived illumination efficiency of the elements of the array which will spatially modulate the part of the projected image corresponding to that portion of the video signal.

16. A method according to claim 15 further characterised in that the scaling does not increase the value of any portion of the video signal.

17. A method according to claim 15 or claim 16 further characterised by the step of setting the power of the light beam so as to reduce the effects of said scaling on the overall brightness of said reproduced image.

* * * * *